(12) United States Patent
Noel et al.

(10) Patent No.: US 10,992,989 B2
(45) Date of Patent: *Apr. 27, 2021

(54) SYSTEMS AND METHODS FOR STREAMING VIDEO EDITS

(71) Applicant: GoPro, Inc., San Mateo, CA (US)

(72) Inventors: Jean-Baptiste Noel, Le Vesinet (FR); Jean Caille, Paris (FR); Matthieu Bouron, San Mateo, CA (US); Francescu Santoni, Bastia (FR)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/988,030

(22) Filed: Aug. 7, 2020

(65) Prior Publication Data

US 2020/0374591 A1 Nov. 26, 2020

Related U.S. Application Data

(63) Continuation of application No. 16/000,706, filed on Jun. 5, 2018, now Pat. No. 10,743,073.

(60) Provisional application No. 62/515,881, filed on Jun. 6, 2017.

(51) Int. Cl.
*H04N 21/472* (2011.01)
*G11B 27/031* (2006.01)
*H04L 29/06* (2006.01)
*H04N 21/2187* (2011.01)

(52) U.S. Cl.
CPC ..... *H04N 21/47205* (2013.01); *G11B 27/031* (2013.01); *H04L 65/4076* (2013.01); *H04N 21/2187* (2013.01)

(58) Field of Classification Search
CPC ......... H04N 21/47205; H04N 21/2187; G11B 27/031; H04L 65/4076
USPC ......................................... 386/278
See application file for complete search history.

(56) References Cited

U.S. PATENT DOCUMENTS

| | | | |
|---|---|---|---|
| 8,191,152 B1 * | 5/2012 | Barker | G06Q 40/00 726/26 |
| 9,170,704 B2 | 10/2015 | Fitzpatrick | |
| 9,286,938 B1 | 3/2016 | Tseytlin | |
| 10,230,866 B1 * | 3/2019 | Townsend | H04N 1/2108 |
| 2015/0281710 A1 | 10/2015 | Sievert | |
| 2016/0042065 A1 | 2/2016 | Basso | |
| 2016/0080835 A1 | 3/2016 | Von Sneidern | |

(Continued)

*Primary Examiner* — Loi H Tran
(74) *Attorney, Agent, or Firm* — Esplin & Associates, PC

(57) ABSTRACT

Video information may define video content. The video content may be characterized by capture information. A remote device may transmit at least a portion of the capture information to a computing device. The computing device may identify one or more portions of the video content based on the transmitted capture information. The remote device may receive the identification of the identified portion(s) of the video content from the computing device. The remote device may stream one or more portions of the video information defining at least some of the identified portion(s) of the video content to the computing device. The streamed video information may enable the computing devices to provide a presentation of at least some of the identified portion(s) of the video content using a buffer of the streamed video information, which may allow the computing device to present the video content without permanently storing the video information.

20 Claims, 7 Drawing Sheets

(56) References Cited

U.S. PATENT DOCUMENTS

| | | |
|---|---|---|
| 2016/0105708 A1 | 4/2016 | Packard |
| 2016/0293216 A1 | 10/2016 | Tost |
| 2017/0229147 A1 | 8/2017 | McKaskle |
| 2018/0190323 A1* | 7/2018 | de Jong ............... G11B 27/034 |
| 2018/0220189 A1 | 8/2018 | Hodge |
| 2019/0044988 A1 | 2/2019 | Oesterreicher |

* cited by examiner

SYSTEMS AND METHODS FOR STREAMING VIDEO EDITS

FIELD

This disclosure relates to streaming portions of video information identified based on capture information.

BACKGROUND

A user may use an image capture device to capture a video. Providing the entire video to another device may be resource intensive. For example, the user may have captured a lengthy video and transmitting information that defines the entire video to another device may require consumption of large amount of bandwidth, processing resources, battery power, and/or storage space.

SUMMARY

This disclosure relates to streaming video edits. Physical storage media accessible to a remote device may store video information defining video content. The video content may be characterized by capture information. The remote device may transmit at least a portion of the capture information to a computing device. The computing device may identify one or more portions of the video content based on the transmitted capture information. The remote device may receive the identification of the identified portion(s) of the video content from the computing device. Responsive to the reception of the identification, the remote device may stream one or more portions of the video information defining at least some of the identified portion(s) of the video content to the computing device. The streamed video information may enable the computing devices to provide a presentation of at least some of the identified portion(s) of the video content using a buffer of the streamed video information. Using the buffer may allow the video content to be presented by the computing device without the computing device permanently storing the video information.

A system that streams video edits may include one or more computing devices, remote devices, and/or other components. The computing device(s) and the remote device(s) may include one or more processors and/or other components. In some implementations, the computing device may include a mobile device and/or another computing device. In some implementations, the remote device may include an image capture device, a server, and/or another remote device.

One or more physical storage media accessible to the remote device may store video information and/or other information. The video information may define video content and/or other content. The video content may be characterized by capture information and/or other information. The capture information may be part of the video information and/or separate from the video information. The capture information may be stored with the video information or separately from the video information.

In some implementations, the capture information may include one or more of capture location information, capture time information, capture motion information, audio information, interest curve information, average color information, histogram information, and/or other information characterizing the video content. The capture location information may define one or more capture locations of the video content. The capture time information may define one or more capture times of the video content. The capture motion information may define one or more capture motion of the video content. The audio information may define one or more audio tracks of the video content. The interest curve information may define values of one or more interest metrics for the video content. The average color information may define average colors of visuals captured within the video content. The histogram information may define one or more histograms of the visuals captured within the video content.

The video content may have been captured by one or more image capture devices. In some implementations, at least a portion of the capture information may be generated by one or more signal processors of the image capture device(s). In some implementations, at least a portion of the capture information may be generated by one or more sensors of the image capture device(s). In some implementations, at least a portion of the capture information may be generated by one or more signal processors external to the image capture device(s). In some implementations, at least a portion of the capture information may be generated by one or more sensors external to the image capture device(s).

The processor(s) of the remote device and the computing device may be configured by machine-readable instructions. Executing the machine-readable instructions may cause the processor(s) to facilitate streaming video edits. The machine-readable instructions may include one or more computer program components. The computer program components of the remote device may include one or more of a capture information transmission component, an identification reception component, a stream transmission component, and/or other computer program components. The computer program components of the computing device may include one or more of a capture information reception component, an identification component, an identification transmission component, a stream reception component, and/or other computer program components.

The capture information transmission component may be configured to transmit at least a portion of the capture information and/or other information to the computing device. The capture information reception component may be configured to receive at least the portion of the capture information and/or other information from the remote device.

The identification component may be configured to identify one or more portions of the video content based on the capture information transmitted by the remote device and/or other information. In some implementations, identifying the portion(s) of the video content based on the capture information may include the computing device identifying one or more undesired portions of the video content based on at least some of the capture information and/or other information. The undesired portion(s) of the video content may not overlap with the identified portion(s) of the video content.

The identification transmission component may be configured to transmit the identification of the one or more identified portions of the video content and/or other information to the remote device. The identification reception component may be configured to receive the identification of the one or more identified portions of the video content and/or other information from the computing device.

The stream transmission component may be configured to, responsive to the reception of the identification, stream one or more portions of the video information defining at least some of the identified portion(s) of the video content to the computing device. The stream reception component may be configured to receive a stream of one or more portions of the video information defining at least some of the identified portion(s) of the video content from the remote device. In some implementations, one or more portions of the video information may be streamed from the remote device to the computing device using wireless communication. In some implementations, the wireless communication may include WiFi communication.

The streamed video information may enable the computing device to provide a presentation of one or more of the identified portion(s) of the video content on a display using one or more buffers of the streamed video information. Using the buffer(s) may allow the video content to be presented by the computing device without the computing device permanently storing the video information.

In some implementations, the stream transmission component may be configured to generate derivative visual information defining one or more derivative visual content based on the identified portion(s) of the video content. Individual derivative visual content may correspond to and may be generated from the individual identified portions of the video content. Individual derivative visual content may be characterized by lower fidelity than the corresponding individual identified portions of the video content.

The stream transmission component may be configured to stream the derivative visual information defining the derivative visual content to the computing device. The stream reception component may be configured to receive a stream of the derivative visual information defining the derivative visual content from the remote device. The streamed derivative visual information may enable the computing device to provide a presentation of the derivative visual content using one or more buffers of the streamed derivative visual information. Using the buffer(s) may allow the video content to be presented by the computing device without the computing device permanently storing the derivative visual information.

In some implementations, the computing device may select one or more of the derivative visual content. The remote device may receive the selection(s) of the derivative visual content from the computing device. The portion(s) of the video information streamed by the stream transmission component 106 may define the identified portion(s) of the video content corresponding to the selected derivative visual content.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1A:
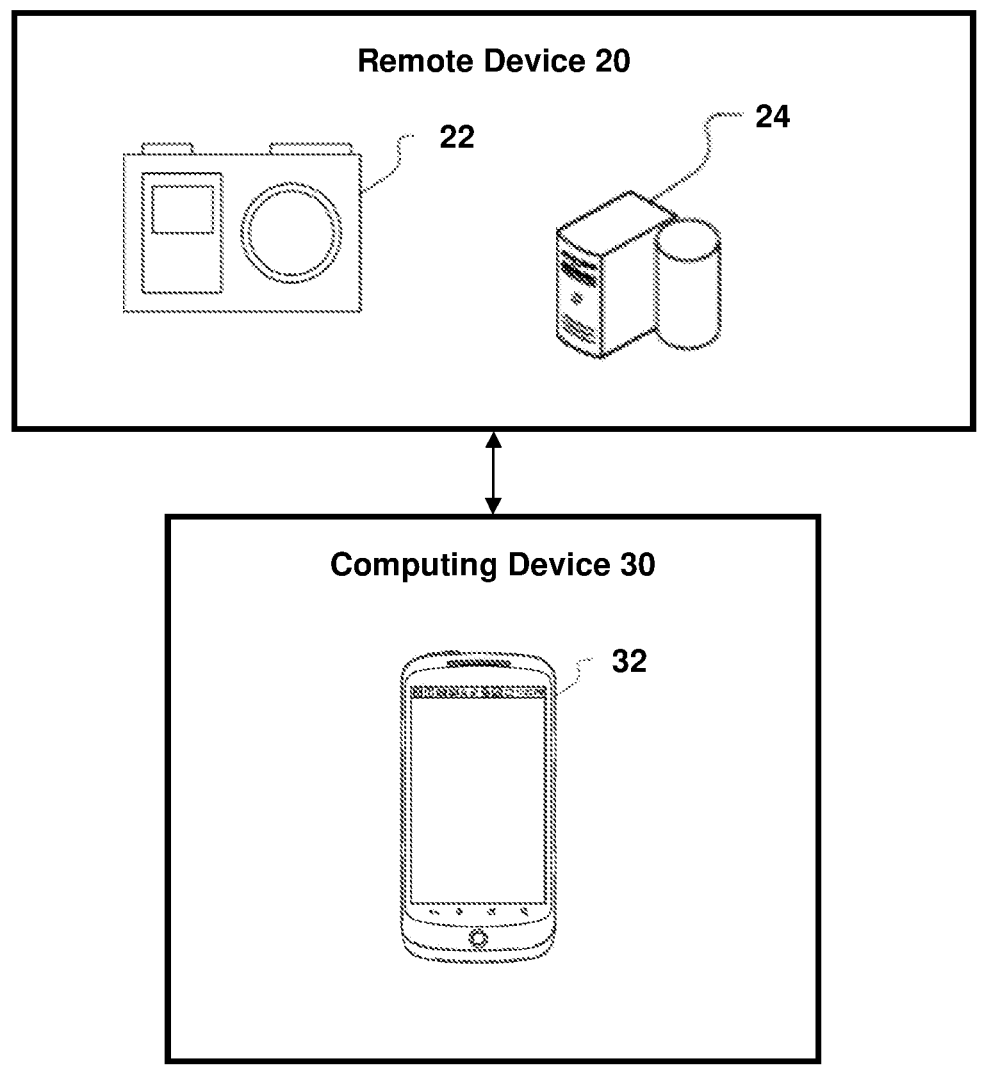
FIG. 1A illustrates an example system that streams video edits.

FIG. 1 illustrates a system 10 for streaming video edits. The system 10 may include one or more of a remote device 20, a computing device 30, and/or other devices/components. Physical storage media (e.g., hard drive, thumb drive, memory cards, optical media) accessible to the remote device 20 may store video information defining video content. The video content may be characterized by capture information. The remote device 20 may transmit at least a portion of the capture information to the computing device 30. The computing device 30 may identify one or more portions of the video content based on the transmitted capture information. The remote device 20 may receive the identification of the identified portion(s) of the video content from the computing device 30. Responsive to the reception of the identification, the remote device 20 may stream one or more portions of the video information defining at least some of the identified portion(s) of the video content to the computing device 30. The streamed video information may enable the computing device 30 to provide a presentation of at least some of the identified portion(s) of the video content using a buffer of the streamed video information. Using the buffer may allow the video content to be presented by the computing device 30 without the computing device 30 permanently storing the video information.

The remote device 20 may refer to a computing device that has access to physical storage media storing video information. The physical storage media (e.g., electronic storage) may be part of the remote device 20 or separate from the remote device 20 (e.g., accessible via network communication, removable storage). In some implementations, the remote device may include one or more of an image capture device 22, a server 24, and/or other remote devices. The image capture device 22 may refer to a device capable of capturing and/or storing videos using one or more image sensors. The videos may be captured at a location or over a range of locations. As a non-limiting example, the image capture device 22 may include a camera (e.g., action camera), a mobile device (e.g., smartphone, tablet), and/or other image capture devices.

The computing device 30 may refer to a device that may provide one or more processing capabilities for the remote device 20 and/or that may provide a presentation of video content on one or more displays. The computing device may include and/or may be coupled to the display(s). The computing device 30 may include a mobile device 32 and/or other computing devices. In some implementations, the remote device 20 may be configured to communicate with the computing device 30 through one or more networks. In some implementations, the remote device 20 may be configured to communicate directly with the computing device 30. The communication between the remote device 20 and the computing device 30 may include wired communication and/or wireless communication.

Figure 1B:
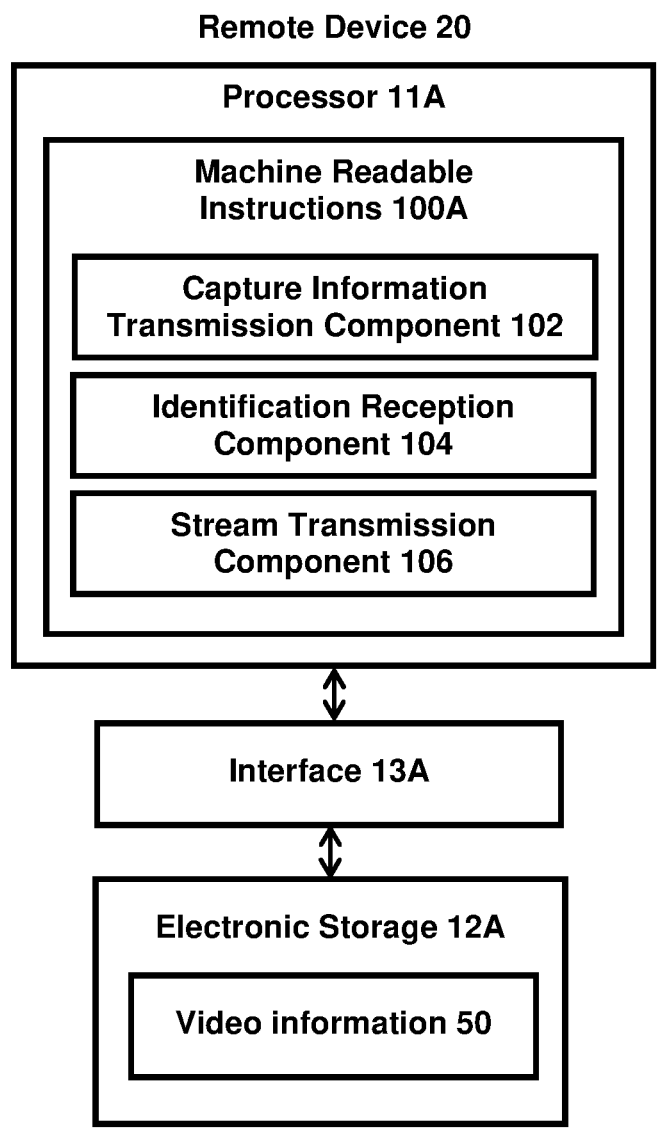
FIG. 1B illustrates an example remote device.
Figure 1C:
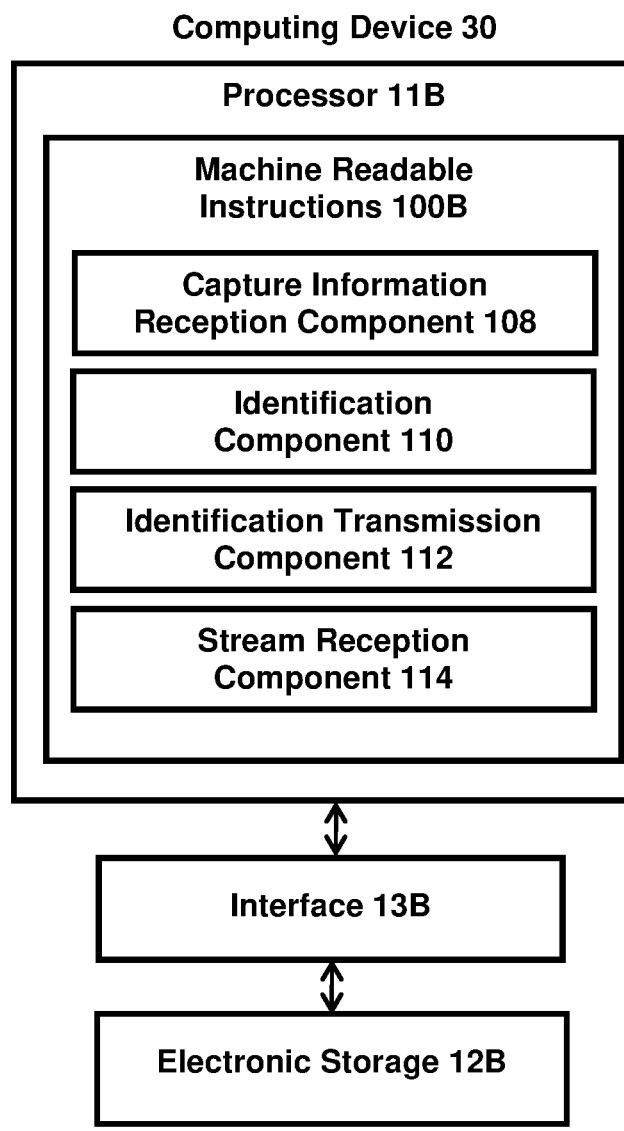
FIG. 1C illustrates an example computing device.

FIG. 1B illustrates an example remote device 20. The remote device 20 may include one or more of a processor 11A, an electronic storage 12A, an interface 13A (e.g., bus, wireless interface), and/or other components. FIG. 1C illustrates an example computing device 30. The computing device 30 may include one or more of a processor 11B, an electronic storage 12B, an interface 13B (e.g., bus, wireless interface), and/or other components.

The electronic storage 12A, 12B may include electronic storage medium that electronically stores information. The electronic storage 12A, 12B may store software algorithms, information determined by the processor 11A, 11B, information received remotely, and/or other information that enables the system 10 to function properly. For example, the electronic storage 12A, 12B may store information relating to one or more of video information, video content, capture information, the remote device 20, the computing device 30, identifying portions within the video content, identified portions of the video content, streamlining of the identified portions of the video content, and/or other information.

A physical storage media accessible to the remote device 20 may store video information and/or other information. The physical storage media may be part of the remote device 20 or separate from the remote device 20 (e.g., accessible via network communication). For example, the physical storage media may include the electronic storage 12A. The electronic storage 12A may store video information 50 and/or other information. The video information 50 may be stored in other locations.

The video information 50 may define video content and/or other content. Video content may refer to media content that may be consumed as one or more videos. Video content may include one or more videos stored in one or more formats/container, and/or other video content. The video content may have a progress length. The video content may be characterized by capture information and/or other information. The capture information may be part of the video information and/or separate from the video information. The capture information may be stored with the video information (e.g., stored as part of the video file, metadata included in the video file) or separately from the video information (stored as a file separate from the video file, metadata not included in the video file).

The capture information may provide information that allows the computing device 30 and/or other devices to identify one or more portions of the video content. The capture information may characterize the whole video content or one or more portions of the video content. The capture information may include general information applicable to the whole video content (e.g., information relating to image capture device/software that captured the video content, fixed capture framerate, fixed capture resolution, a single capture location) and/or specific information applicable to certain portions of the video content (e.g., different capture framerates, different capture resolutions, different capture locations, different capture motions, different captured visuals/audio for different portions of the video content).

In some implementations, the capture information may include one or more of capture location information, capture time information, capture motion information, audio information, interest curve information, average color information, histogram information, and/or other information characterizing the video content. The capture location information may define one or more capture locations (location in which the video content was captured) of the video content. The capture time information may define one or more capture times (e.g., time/date/duration of capture) of the video content. The capture motion information may define one or more capture motion (motion of the capture device) of the video content. The audio information may define one or more audio tracks of the video content. The interest curve information may define values of one or more interest metrics for the video content. An interest metric may refer to one or more measurements indicating whether portions of the video content include capture of visuals that are of interest to one or more users. The average color information may define average colors of visuals captured within the video content. The histogram information may define one or more histograms (e.g., image histogram, color histogram, luminance histogram) of the visuals captured within the video content.

In some implementations, the capture information may include information gathered during or adjacent to capture of video content. The capture information may have been gathered by the image capture device(s) capturing the video content and/or other devices (e.g., other sensors). For example, the capture information may include outputs from sensors of/or external to (e.g., near) the image capture device(s), such as biometric sensors (e.g., heart rate sensor), vehicle sensors (e.g., measuring speed, acceleration, direction, temperature), stationary sensors (e.g., sensors affixed to building/structure), mobile sensors (e.g., sensors moving with an object/attached to a moving object), and/or other sensors. Other types of capture information are contemplated.

In some implementations, at least a portion of the capture information may be generated by one or more signal processors of one or more image capture devices that captured the video content. For example, the video content may have been captured by the image capture device 22. Image signal processor(s) of the image capture device 22 may provide information/statistics regarding one or more portions of the video content as capture information. The image signal processor(s) may provide statics relating to sampling and/or encoding of the video content, such as average colors of the visuals captured within the video content and/or histogram information, at low cost (e.g., fast operation, low consumption of battery power). Use of the capture information generated by the image signal processor(s) may enable the computing device 30 to identify moments within video content using already existing information and/or information generated at low cost.

In some implementations, at least a portion of the capture information may be generated by one or more signal processors/sensors external to the image capture device 22. The portion of the capture information may be generated by the external signal processor(s) during the capture of the video content by the image capture device 22. The capture information generated by external signal processor(s) may be transmitted to the image capture device 22 for storage. The image capture device may store the portion of the capture information with/coincident with the video information and/or other capture information.

The processor 11A, 11B may be configured to provide information processing capabilities in the system 10, the remote device 20, and/or the computing device 30. As such, the processor 11A, 11B may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11A, 11B may be configured to execute one or more machine readable instructions 100A, 100B to facilitate streaming video edits. The machine readable instructions 100A, 100B may include one or more computer program components. The machine readable instructions 100A may include one or more of a capture information transmission component 102, an identification reception component 104, a stream transmission component 106, and/or other computer program components. The machine readable instructions 100B may include one or more of a capture information reception component 108, an identification component 110, an identification transmission component 112, a stream reception component 114, and/or other computer program components.

The capture information transmission component 102 may be configured to transmit at least a portion of the capture information and/or other information to the computing device 30. The capture information transmission component 102 may transmit one or more portions of the capture information to the computing device 30 without transmitting the video information 50 defining the video content. The capture information transmission component 102 may transmit the portion(s) of the capture information before transmitting the video information 50 defining the video content (or one or more portions of the video information 50 defining the video content).

The capture information reception component 108 may be configured to receive at least the portion of the capture information and/or other information transmitted by the remote device 20. The capture information reception component 108 may receive the portion(s) of the capture information before/without receiving the video information 50 defining the video content (or one or more portions of the video information 50 defining the video content). Receiving the capture information before/without the video information 50 may enable the computing device 30 to identify one or more portions of the video content without having the video information 50 defining the video content.

The identification component 110 may be configured to identify one or more portions of the video content based on the capture information transmitted by the remote device 20 and/or other information. One or more portions of the video content corresponding to particular moments (e.g., particular points/duration within the progress of the video content) and/or particular views (e.g., particular direction of view/field of view/zoom within the video content, such as the direction of viewing angle/zoom for spherical video content) in the video content may be identified based on the capture information. For example, the identification component 110 may identify one or more portions of the video content based on one or more of capture location information, capture time information, capture motion information, audio information, interest curve information, average color information, histogram information, and/or other information characterizing the video content. The identification of the portions of the video content may be used to create a video edit of the video content. A video edit may define/specify (1) particular portions of the video content to be presented within a view of the video content, and (2) the order in which the particular portions should be presented. A video edit may define/specify other aspects of presenting the video content, such as visual and/or audio effects, synchronization of the video content/portions of the video content to one or more musical tracks, and/or other aspects of presenting the video content.

In some implementations, identification component 110 may compare the values of the capture information to one or more threshold/particular values to determine portions of the video content containing one or more particular moments. For example, the identification component 110 may use the capture information to identify portions of the video content containing moments/views captured at particular locations, moments/views captured at particular times, moments/views captured for particular durations, moments/views captured using particular motions, moments/views including particular audio/sounds, moments/views including particular visuals/activity/scene/thing, moments/views including particular (and/or average/distribution of) colors, tones, intensity, brightness, luminosity, contrast, and/or portions of video content containing/associated with other information.

Figure 3A:
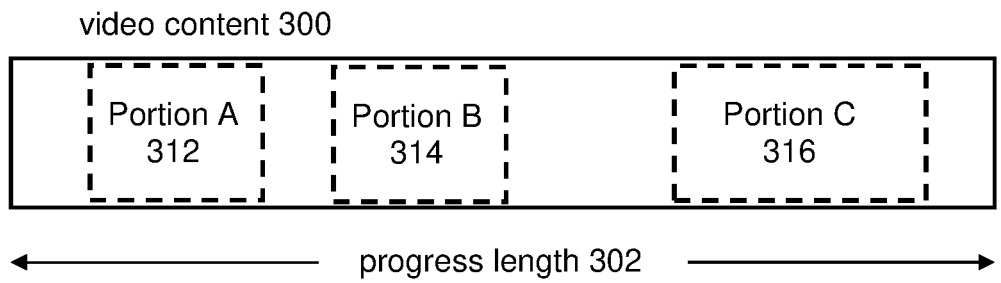
FIGS. 3A-3C illustrates example identification of portions of video content.
Figure 3B:
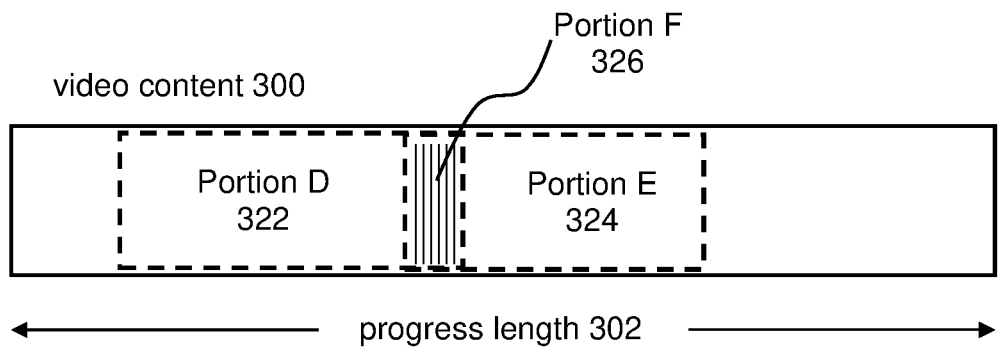
Figure 3C:
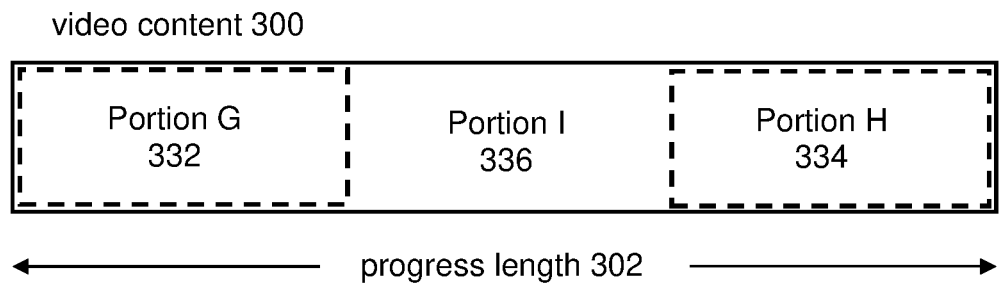

FIGS. 3A-3C illustrates example identifications of portions of video content 300. The video content 300 may have a progress length 302 (defined via capture/play duration and/or number of frames). The identification component 110 may identify one or more portions of the video content 300. A portion may include a point or a duration in the progress length 302. For example, in FIG. 3A, the identification component 110 may identify three portions (a portion A 312, a portion B 314, a portion C 316) of the video content 300 based on the capture information. The portions 312, 314, 316 may occur at different moments in the progress of the video content 300. The portions 312, 314, 316 may be associated with the same or different views of the video content 300.

In FIG. 3B, the identification component 110 may identify two portions (a portion D 322, a portion E 324) of the video contents based on the capture information. The portions 322, 324 may overlap, identifying a portion F 326. In some implementations, the identifications of the identified portions of the video content 300 (to be transmitted to the computing device 30) may include (1) the portion D 322 and the portion E 324, (2) the portion D 322, the portion E 324, and the portion F 326, (3) the portion F 326, and/or other combinations of the portions 322, 324, 326 (e.g., the portion D 322 and the portion E 324 may be merged into a single portion based on the overlap).

In some implementations, identifying the portion(s) of the video content based on the capture information may include the identification component 110 identifying one or more undesired portions of the video content based on at least some of the capture information and/or other information. Certain types/values of capture information may not provide a good basis for determining interesting/desirable moments captured within the video content, but may provide a good basis for determine uninteresting/undesirable moments captured within the video content. For example, average RGB values/statistics calculated by the image signal processor(s) of the image capture device may not provide a good basis for identifying highlight/desirable moments, but may provide a good basis for the identification component 110 to determine when certain moments within the video content are not interesting/desirable. The undesired portion(s) of the video content may not overlap with the identified portion(s) of the video content—that is, the identification component 30 may identify portions of the video content based on a negative (the identified portions of the video content include inverse of the undesired portions).

For example, FIG. 3C illustrates identification of video portion(s) based on identifying undesired portion(s) of the video content 300. In FIG. 3C, the identification component 110 may identify two undesired portions (a portion G 332, a portion H 334) of the video contents based on the capture information. The desired portion of the video content 300 may be identified based on the inverse of the undesired portions 332, 334—the desired portion may be identified as a portion I 336. In some implementations, the identifications of the identified portions of the video content 300 (to be transmitted to the computing device 30) may include (1) the portion G 332 and the portion H 334, (2) the portion G 332, the portion H 334, and the portion I 336, (3) the portion I 336, and/or other combinations of the portions 332, 334, 336.

Transmitting/receiving the capture information before transmitting/receiving the video information defining the video content, and using the capture information to identify video portion(s) may enable the system 10 to conserve resources (e.g., bandwidth of communication between the remote device 20 and the computing device 30, processing by the remote device 20/the computing device 30, power/battery of the remote device 20/the computing device 30, storage space of the computing device 30) in streaming the video content/portions of the video content and/or performing other operations on the video content/portions of the video content, such as previewing, editing, presenting the video content/portions of the video content.

For example, moments/views of interest may be identifiable from an audio of the video content and/or telemetry readings (e.g., location information, capture motion information) from recording of the video content. The audio and/or telemetry readings may be much smaller in size (e.g., hundreds to thousands of times) than the video information defining the video content (e.g., the video file). Rather than transmitting large video files, which may consume a lot of resources (e.g., bandwidth and storage space), the audio and telemetry readings may be transmitted by the remote device 20 to the computing device 30. The computing device 30 may use the audio and telemetry readings to identify portions of the video content containing moments/views of interest/undesired moments/views and transmit the identification of the portions to the remote device 20 for further processing (e.g., video edit, video display, video streaming). Such use of capture information may consume less power/battery/processing resources of the remote device 20 and/or the computing device 30. Such use of capture information may allow the computing device 30 to avoid using its (limited) storage space to store video content/portions of the video content. Instead, the video content/portions of the video content may be streamed to the computing device 30 for viewing/editing.

In some implementations, the capture information may be stored by the computing device 30. For example, the computing device 30 may receive audio data for video content from the remote device 20. The computing device 30 may initially use speech detection on the audio data to identify particular moments/views within the video content. The computing device 30 may later use other techniques (e.g., wind detection) to change the identification of particular moments/views within the video content. Thus, computing device 30 storing the capture information may allow the computing device 30 to perform multiple analysis of the capture information at different times without requesting the capture information from the remote device 20 multiple times. Once the analysis of the capture information/video content is complete, the computing device 30 may remove/delete the capture information to conserve storage space The identification transmission component 110 may be configured to transmit the identification of the one or more identified portions of the video content and/or other information to the remote device 20. The identification reception component 104 may be configured to receive the identification of the one or more identified portions of the video content and/or other information from the computing device 30. The transmission of the identification may be completed in a single communication session or multiple communication sessions (e.g., resume after losing connection).

The stream transmission component 106 may be configured to, responsive to the reception of the identification of the portions of the video content, stream one or more portions of the video information defining at least some of the identified portion(s) of the video content to the computing device 30. The video information defining one or more identified portion(s) of the video content may be streamed by the remote device 20 to the computing device 30 without/separately from the video information defining other portion(s) of the video content. In some implementations, one or more portions of the video information may be streamed from the remote device to the computing device using wireless communication, such as WiFi communication, Bluetooth communication, radio communication, cellular communication, and/or other wireless communication.

For example, rather than transmitting entirety of the video information defining video content to the computing device 30, the stream transmission component 106 may use one or more HTTP servers to stream portions (e.g., byte ranges) of the video information corresponding to one or more of the identified portion(s) of the video content. The computing device 30 providing the identifications of the portions of the video content to the remote device 20 may effectuate a request by the computing device 30 for specific portions (e.g., specific ranges of bytes) of the video information accessible/stored by the remote device 20.

Streaming one or more portions of the video information may enable the computing device 30 to provide a presentation of the corresponding portion(s) of the video content without downloading the entirety of the video information defining the video content. Streaming one or more portions of the video information may enable the computing device 30 to provide a presentation of the corresponding portion(s) of the video content as the stream(s) are received. In some implementations, streaming of portions of the video information may include separate or combined streaming of visual information contained within the video information, audio information contained within the video information, and/or other information contained within the video information. Visual, audio, and/or other information may be compressed to reduce the size of the stream(s).

The stream reception component 112 may be configured to receive one or more streams of one or more portions of the video information defining at least some of the identified portion(s) of the video content from the remote device 20. The stream reception component 112 (and/or another component of the computing device 30) may effectuate presentation of the streamed portions of the video content on one or more displays. For example, the stream reception component 112 may receive stream(s) of video information over WiFi using HTTP (or other streaming) protocol, and the computing device 30 may provide presentation of the streamed video portions on a display as the stream(s) are received. Such presentation of the streamed video portions may be referred to as a "live" view (e.g., live preview) of the streamed video portions.

The streamed video information may enable the computing device 30 to provide a presentation of one or more of the identified portion(s) of the video content on one or more displays using one or more buffers of the streamed video information. For example, the reception of streamed video information and the presentation of the streamed video portion may occur substantially in parallel, such that the computing device 30 requests/receives video information needed to render live view of the streamed video content a set amount of time (e.g., two seconds) before the video information is needed. For example, the computing device 30 may receive a particular frame of the video content from the remote device 20 two seconds before that particular frame is needed for live view of the video content.

Using buffer(s) may allow the video content to be presented by the computing device 30 without the computing device 30 permanently storing the video information. Rather than presenting views of the video content after a complete download/transfer of the video information defining the video content, a portion of the video information may be streamed at a time and buffered at the computing device 30. The video information stored in the buffer may be replaced as new video information is received/old video information is processed for presentation on a display. Thus, by using buffer(s), the computing device 30 may provide presentation of the streamed video content without permanently storing the received video information in (local) memory.

In some implementations, the stream transmission component 106 may stream portions of video information and the stream reception component 114 may receive the portions of the video information quickly enough such that streaming of video information/video content may allow for live rendering of the streamed video content.

In some implementations, the stream transmission component 106 may be configured to generate derivative visual information defining one or more derivative visual content based on the identified portion(s) of the video content. Derivative visual content may refer to derivative video content and/or derivative images. Individual derivative visual content may correspond to and may be generated from the individual identified portions of the video content. The individual derivative visual content may be characterized by lower fidelity than the corresponding individual identified portions of the video content. Lower fidelity may include one or more of lower resolution, lower framerate, higher compression, and/or other lower fidelity.

The stream transmission component 106 may be configured to stream the derivative visual information defining the derivative visual content to the computing device 30. The stream reception component 112 may be configured to receive one or more streams of the derivative visual information defining the derivative visual content from the remote device 20. The streamed derivative visual information may enable the computing device 30 to provide a presentation of the derivative visual content using one or more buffers of the streamed derivative visual information. Using the buffer(s) may allow the video content to be presented by the computing device 30 without the computing device 30 permanently storing the derivative visual information.

Derivative visual information streamed to the computing device 30 may be used to provide previews of the video content/portions of the video content, for analysis of the video content/portions of the video content, and/or for other operations. For example, streamed derivative visual content may be presented by the computing device 30 as a preview of a video edit composed of the identified video portion(s). The user may use the streamed derivative visual content to make changes to the video edit (e.g., changing the portions of the video content included in the video edit, changing transitions between portions of the video content, adding visuals/audio effects, synchronizing the video edit to different musical tracks). The streamed derivative visual content may be used by the computing device 30 for further analysis of the video content. For example, the computing device 30 may use the streamed derivative visual content to perform object/scene/action detection and/or other visual analysis of the video content, and may use the results of such analysis to further refine the video edit.

In some implementations, a high fidelity (e.g., high resolution) stream and a low fidelity (e.g., low resolution) stream of the video content may be used to provide presentation of the video content. For example, the low fidelity stream may be used to provide previews of video edits while the high fidelity stream may be used to provide views of the video edits. In some implementations, the high fidelity stream may be used to provide previews of the video edit when the available bandwidth is high and/or based on a request to use high fidelity stream for previewing. In some implementations, the low fidelity stream may be used to provide views of the video edits when the available bandwidth is low and/or based on a request to use low fidelity stream for viewing. In some implementations, the system 10 may switch between the high fidelity stream and the low fidelity stream during streaming, such as when the available bandwidth between the remote device 20 and the computing device 30 changes during streaming.

In some implementations, one or more of the derivative visual content may be selected by the computing device 30 for further operations. The selection(s) may be made based on computer analysis of the derivative visual content and/or user selection (e.g., a user selecting one or more derivative visual content via interaction with the mobile device 32). The remote device 20 may receive the selection(s) of the derivative visual content from the computing device 30. Responsive to reception of the selection, the remote device 20 may transmit the video information defining the identified portion(s) of the video content corresponding to the selected derivative visual content to the computing device 30. That is, the portion(s) of the video information streamed by the stream transmission component 106 may define the identified portion(s) of the video content corresponding to the selected derivative visual content.

A user may interact with the computing device 30 (e.g., the mobile device 32) to perform other operations on the video content/portion(s) of the video content. For example, a user may use the computing device 30 to preview and/or edit one or more identified portions of the video content. The user may be presented with option(s) to view, edit, delete, and/or otherwise consume the identified portion(s) of the video content.

A user may interact with the computing device 30 to finalize the video edits. For example, a user may use derivative visual content to preview and/or modify a video edit. The user may request the video edit to be exported. Exporting the video edit may include streaming, by the remote device 20, of the video information defining portion(s) of the video content included in the video edit to the computing device 30 for presentation. Exporting the video edit may include generation of one or more files (video edit file(s)) that describes the video edit. The video edit file(s) may be stored at the computing device 30 and/or the remote device 20 (e.g., as backup file(s)). When the video edit is requested to be played on/by the computing device 30 (e.g., responsive to a user request to play the video edit), the computing device 30 may use the vide edit file(s) to request the necessary video information from the remote device 20.

In some implementations, the remote device 20 (e.g., the image capture device 22) may be configured to operate in a streaming mode. The image capture device 22 may switch its operation from its mode(s) of operation, such as video/image capture mode and/or sleep mode, to the streaming mode based on a determination that the image capture device 22 is operating to stream video content to the computing device 30 for viewing/editing and/or based on a request by the computing device for the remote device 30 to provide capture information and/or video information. While operating in the streaming mode, the image capture device 22 may deactivate/not use one or more functions of the image capture device 22 to limit power consumption. For example, the image capture device 22 may turn off one or more sensors and/or encoders to limit power consumption while operating in the streaming mode. In some implementations, the image capture device 22 may indicate (e.g., via lights, visuals presented on a display of the image capture device 22) that it is operating in the streaming mode.

In some implementations, one or more functionalities of the remote device 20 may be included in/performed by the computing device 30. In some implementations, one or more functionalities of the computing device 30 may be included in/performed by the remote device 20. For example, one or more functionalities of the identification component 110 of the computing device 30 may be included in/performed by the remote device 20. In such a case, the analysis of the capture information to identify one or portions of the video content may be determined by the remote device 20, rather than the computing device 30. Migrating the functionalit(ies) of the identification component 110 from the computing device 30 (e.g., mobile device) to the remote device 20 (e.g., image capture device) may enable the remote device 20 to identify desired/undesired portions of the video content without communicating with the computing device 30. Other migrations of the functionalities of the remote device 20 and/or the computing device 30 are contemplated.

Figure 4:
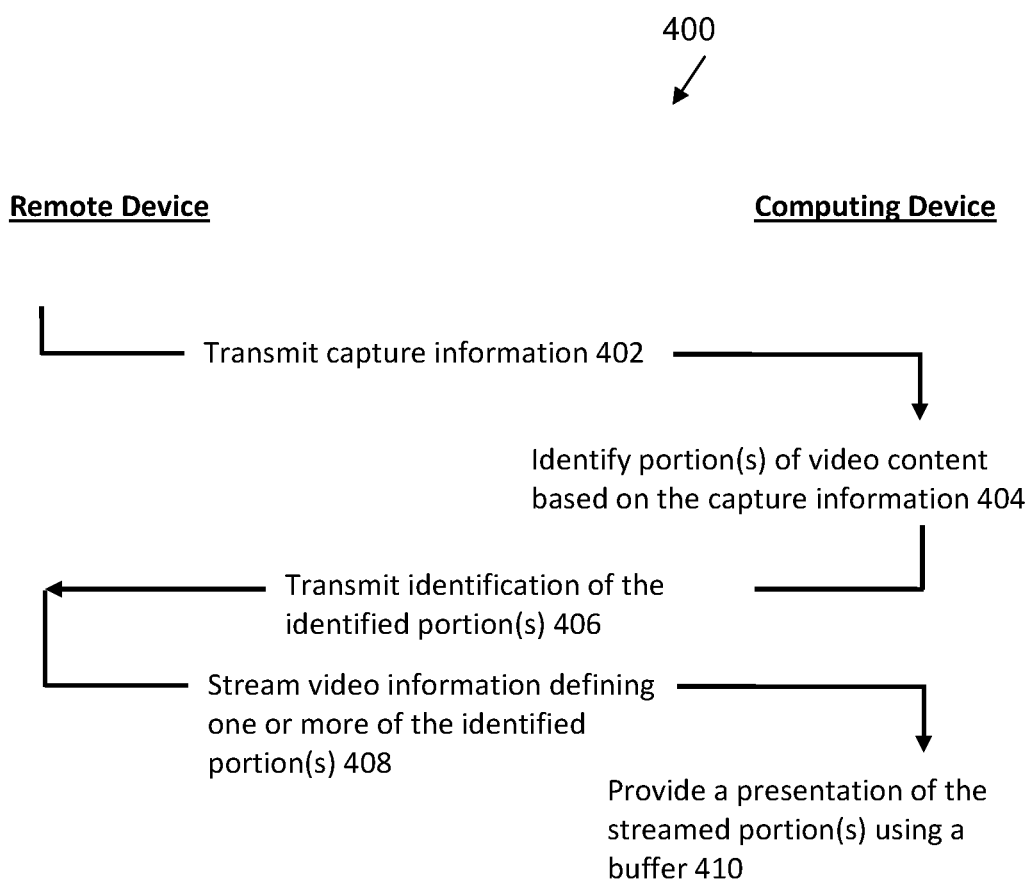
FIG. 4 illustrates an example process flow of a remote device and a computing device for streaming video edits.

FIG. 4 illustrates exemplary process flow of a remote device (e.g., the remote device 20) and a computing device (e.g., the computing device 30) for streaming video edits. The remote device may have access to video information defining video content. The video content may be characterized by capture information. The remote device may transmit some or all of the capture information 402 to the computing device. The computing device may identify one or more portions of the video content based on the received captured information 404. The computing device may transmit identification of the identified portion(s) of the video content 406 to the remote device. The remote device may stream one or more portions of the video information defining one or more identified portion(s) of the video content 408 to the computing device. The computing device may provide a presentation of the streamed portion(s) of the video content using a buffer 410.

Figure 5:
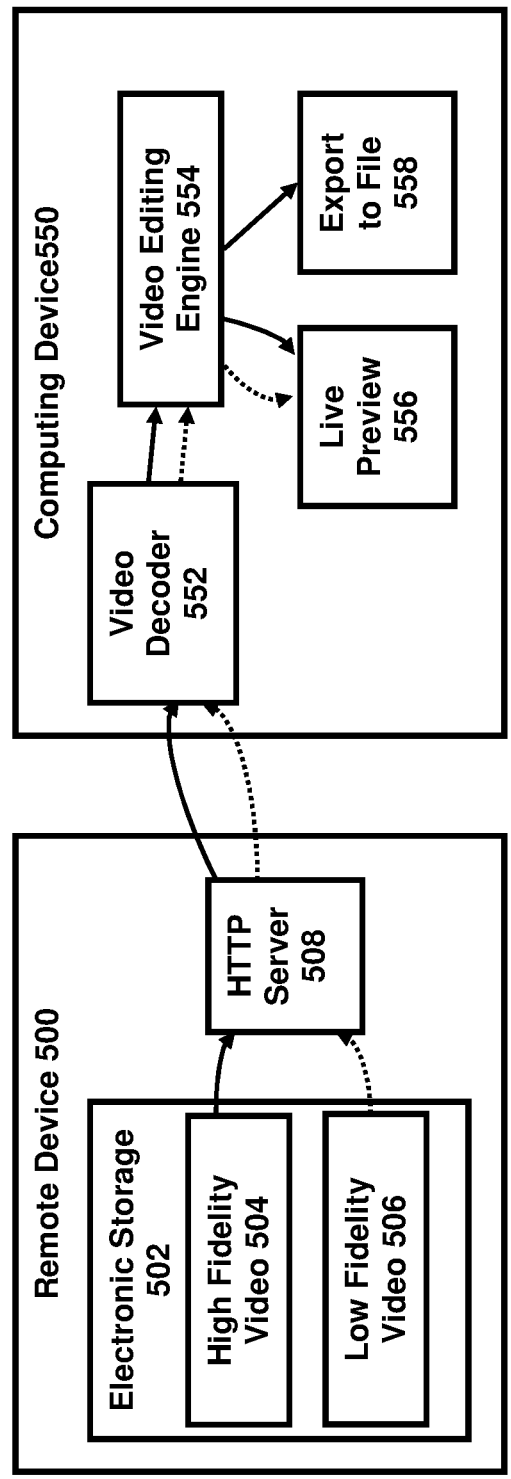
FIG. 5 illustrates an example system architecture for streaming video edits.

FIG. 5 illustrates an example system architecture for streaming video edits. A remote device 500 may include electronic storage 502, which stores information defining high fidelity video 504 and low fidelity video 506. The high fidelity video 504 and/or the low fidelity video 506 may be streamed by the remote device 500 to a computing device 550 via an HTTP server 508. The stream(s) of the high fidelity video 504 and/or the low fidelity video 506 may be processed by a video decoder 522 of the computing device 550. The processed high fidelity video 504 and/or the low fidelity video 506 may be further processed by a video editing engine 554 to provide edits to the streamed video. Live preview 556 of the high fidelity video 504 and/or the low fidelity video 506 may be presented by the computing device 550. The finalized video edit may be exported to file 558.

The approach disclosed herein provides for identification of portions of video content using capture information and streaming of the identified portion(s) for presentation on a computing device (e.g., mobile device). The use of capture information and the streaming of the identified portion(s) provide for a fast and simple user experience in consuming video content. For example, responsive to establishing a connection between the computing device and a remote device (e.g., image capture device/server having access to the video content), a user may be presented with video content available from the storage of/accessible to the remote device for viewing on the computing device. Based on a user's selection of particular video content, the capture information characterizing the particular video content may be transmitted to the commuting device.

The capture information may allow the computing device to perform analysis of the video content without downloading the video content. The computing device may identify particular portions of the video content based on the analysis of the capture information and may request portions (e.g., specific byte ranges) of the video information corresponding to the identified portion(s) from the remote device. This allows the computing device to avoid downloading the entirety of the video content for viewing, which is much slower compared to the streaming of the identified portion(s) of the video content. Streaming identified portion(s) of the video content may allow the computing device to provide a presentation of the streamed video content without permanently storing the video content/portions of the video content in its local storage. This further avoids duplication of video content storage on both the remote device and the computing device. The user/computing device may create/modify video edits and the video edits may be exported to view the video edit and/or to generated video edit file(s) describing the video edit.

In some implementations, video content may include one or more of spherical video content, virtual reality content, and/or other video content. Spherical video content and/or virtual reality content may define visual content viewable from one or more points of view as a function of progress through the spherical/virtual reality video content.

Spherical video content may refer to a video capture of multiple views from a single location. Spherical video content may include a full spherical video capture (360 degrees of capture) or a partial spherical video capture (less than 360 degrees of capture). Spherical video content may be captured through the use of one or more cameras/image sensors to capture images/videos from a location. The captured images/videos may be stitched together to form the spherical video content.

Virtual reality content may refer to content that may be consumed via virtual reality experience. Virtual reality content may associate different directions within the virtual reality content with different viewing directions, and a user may view a particular directions within the virtual reality content by looking in a particular direction. For example, a user may use a virtual reality headset to change the user's direction of view. The user's direction of view may correspond to a particular direction of view within the virtual reality content. For example, a forward looking direction of view for a user may correspond to a forward direction of view within the virtual reality content.

Spherical video content and/or virtual reality content may have been captured at one or more locations. For example, spherical video content and/or virtual reality content may have been captured from a stationary position (e.g., a seat in a stadium). Spherical video content and/or virtual reality content may have been captured from a moving position (e.g., a moving bike). Spherical video content and/or virtual reality content may include video capture from a path taken by the capturing device(s) in the moving position. For example, spherical video content and/or virtual reality content may include video capture from a person walking around in a music festival.

While the description herein may be directed to video content, one or more other implementations of the system/method described herein may be configured for other types media content. Other types of media content may include one or more of audio content (e.g., music, podcasts, audio books, and/or other audio content), multimedia presentations, images, slideshows, visual content (one or more images and/or videos), and/or other media content.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although processor 11A, 11B and electronic storage 12A, 12B are shown to be connected to interface 13A, 13B in FIGS. 1B-1C, any communication medium may be used to facilitate interaction between any components of system 10 (e.g., the remote device 20, the computing device 30). One or more components of system 10 may communicate with each other through hard-wired communication, wireless communication, or both. For example, one or more components of system 10 may communicate with each other through a network. For example, processor 11A, 11B may wirelessly communicate with electronic storage 12A, 12B. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11A, 11B are shown in FIGS. 1B-1C as a single entity, this is for illustrative purposes only. In some implementations, the processor 11A, 11B may comprise a plurality of processing units. These processing units may be physically located within the same device, or the processor 11A, 11B may represent processing functionality of a plurality of devices operating in coordination. The processor 11A, 11B may be configured to execute one or more components by software; hardware; firmware; some combination of software, hardware, and/or firmware; and/or other mechanisms for configuring processing capabilities on the processor 11A, 11B.

It should be appreciated that although computer components are illustrated in FIGS. 1B-1C as being co-located within a single processing unit, in implementations in which the processor 11A, 11B comprises multiple processing units, one or more of computer program components may be located remotely from the other computer program components.

While the computer program components are described herein as being implemented via processor 11A, 11B through machine readable instructions 100A, 100B, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, the processor 11A, 11B may be configured to execute one or more additional computer program components that may perform some or all of the functionality attributed to one or more of computer program components described herein.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

The electronic storage media of the electronic storage 12A, 12B may be provided integrally (i.e., substantially non-removable) with one or more components of the system 10 (e.g., the remote device 20, the computing device 30) and/or removable storage that is connectable to one or more components of the system 10 via, for example, a port (e.g., a USB port, a Firewire port, etc.) or a drive (e.g., a disk drive, etc.). The electronic storage 12A, 12B may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 12A, 12B may be a separate component within the system 10, or the electronic storage 12A, 12B may be provided integrally with one or more other components of the system 10 (e.g., the processor 11A, 11B). Although the electronic storage 12A, 12B are shown in FIGS. 1B-1C as a single entity, this is for illustrative purposes only. In some implementations, the electronic storage 12A, 12B may comprise a plurality of storage units. These storage units may be physically located within the same device, or the electronic storage 12A, 12B may represent storage functionality of a plurality of devices operating in coordination.

Figure 2:
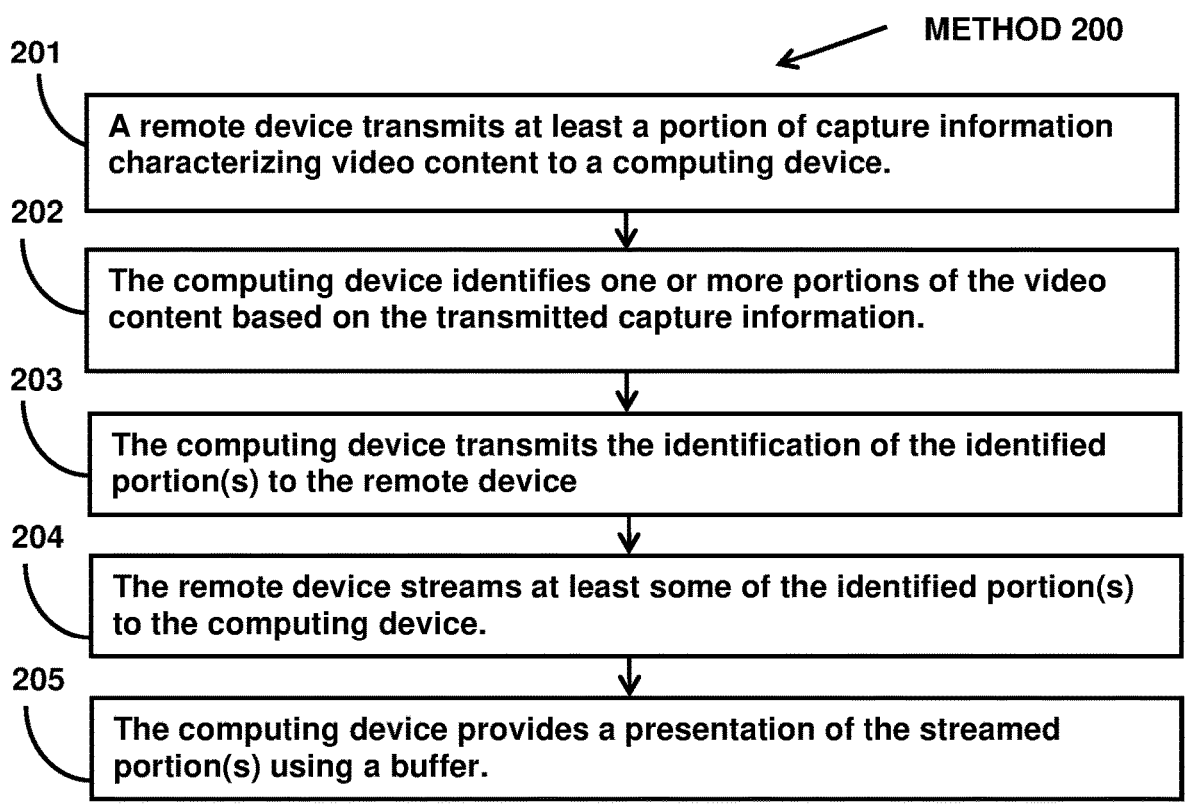
FIG. 2 illustrates an example method for streaming video edits.

FIG. 2 illustrates method 200 for identifying moments within videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, a remote device may transmit at least a portion of capture information characterizing video content. The capture information may be transmitted to a computing device. In some implementations, operation 201 may be performed by a processor component the same as or similar to the capture information transmission component 102 (Shown in FIG. 1B and described herein).

At operation 202, the computing device may identify one or more portions of the video content based on the transmitted capture information. In some implementations, operation 202 may be performed by a processor component the same as or similar to the identification component 110 (Shown in FIG. 1C and described herein).

At operation 203, the computing device may transmit the identification of the identified portion(s). The identification of the identified portion(s) may be transmitted to the remote device. In some implementations, operation 203 may be performed by a processor component the same as or similar to the identification transmission component 112 (Shown in FIG. 1C and described herein).

At operation 204, the remote device may, responsive to the reception of the identification, stream at least some of the identified portion(s) to the computing device. In some implementations, operation 204 may be performed by a processor component the same as or similar to the stream transmission portion 106 (Shown in FIG. 1B and described herein).

At operation 205, the computing device may provide a presentation of the streamed portion(s) using a buffer. Using the buffer may allow the streamed video content to be presented by the computing device without the computing device permanently storing the streamed video content. In some implementations, operation 205 may be performed by a processor component the same as or similar to the stream reception portion 112 (Shown in FIG. 1C and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system that streams video edits, the system comprising: one or more physical processors configured by machine-readable instructions to:

transmit at least a portion of capture information characterizing video content to a computing device prior to transmission of the video content to the computing device, the transmitted capture information enabling the computing device to positively identify one or more undesirable portions of the video content without the video content while not enabling the computing device to positively identify one or more desirable portions of the video content, wherein the transmitted capture information that enables positive identification of the one or more undesirable portions of the video content while not enabling positive identification of the one or more desirable portions of the video content includes average color information defining average colors of visuals captured within the video content, the computing device identifying the one or more undesirable portions of the video content based on the transmitted capture information and identifying one or more potentially desirable portions of the video content to include an inverse of the one or more undesirable portions of the video content;

receive the identification of the one or more potentially desirable portions of the video content from the computing device; and responsive to the reception of the identification, stream one or more portions of video information defining at least some of the one or more potentially desirable portions of the video content to the computing device.

2. The system of claim 1, wherein the one or more physical processors are further configured by the machine-readable instructions to:

generate derivative visual information defining one or more derivative visual content based on the one or more potentially desirable portions of the video content, individual derivative visual content corresponding to and generated from the individual potentially desirable portions of the video content, the individual derivative visual content characterized by lower fidelity than the corresponding individual potentially desirable portions of the video content; and stream the derivative visual information defining the one or more derivative visual content to the computing device.

3. The system of claim 2, wherein the one or more physical processors are, to stream the one or more portions of the video information defining at least some of the one or more potentially desirable portions of the video content to the computing device, further configured by the machine-readable instructions to:

receive one or more selections of the derivative visual content from the computing device, wherein the at least some of the one or more potentially desirable portions of the video content correspond to the one or more selected derivative visual content.

4. The system of claim 1, wherein the capture information further includes one or more of capture motion information defining capture motion of the video content, or histogram information defining one or more histograms of the visuals captured within the video content.

5. The system of claim 1, wherein the at least some of the transmitted capture information includes average RGB values calculated by one or more image signal processors of an image capture device that captured the video content.

6. The system of claim 5, wherein the computing device stores the transmitted capture information to perform different analysis of the transmitted capture information at different times to identify different portions of the video content without requesting retransmission of the capture information.

7. A system that receives streams of video edits, the system comprising:

one or more physical processors configured by machine-readable instructions to:
receive at least a portion of capture information characterizing video content from a remote device prior to reception of the video content from the remote device, the received capture information enabling the one or more physical processors to positively identify one or more undesirable portions of the video content without the video content while not enabling the one or more physical processors to positively identify one or more desirable portions of the video content, wherein the received capture information that enables positive identification of the one or more undesirable portions of the video content while not enabling positive identification of the one or more desirable portions of the video content includes average color information defining average colors of visuals captured within the video content;
identify the one or more undesirable portions of the video content based on the received capture information and without the video content;
identify one or more potentially desirable portions of the video content to include an inverse of the one or more undesirable portions of the video content;
transmit the identification of the one or more potentially desirable portions of the video content to the remote device; and
receive a stream of one or more portions of video information defining at least some of the one or more potentially desirable portions of the video content from the remote device.

8. The system of claim 7, wherein the one or more physical processors are further configured by the machine-readable instructions to:
receive a stream of derivative visual information defining one or more derivative visual content from the remote device, the derivative visual information generated based on the one or more potentially desirable portions of the video content by the remote device, individual derivative visual content corresponding to and generated from the individual potentially desirable portions of the video content, the individual derivative visual content characterized by lower fidelity than the corresponding individual potentially desirable portions of the video content;
select one or more of the derivative visual content; and
transmit the one or more selections of the derivative visual content to the remote device, wherein the at least some of the one or more potentially desirable portions of the video content correspond to the one or more selected derivative visual content.

9. The system of claim 7, wherein the capture information further includes one or more of capture motion information defining capture motion of the video content, or histogram information defining one or more histograms of the visuals captured within the video content.

10. The system of claim 7, wherein the at least some of the received capture information includes average RGB values calculated by one or more image signal processors of an image capture device that captured the video content.

11. A method for streaming video edits, the method performed by a remote system including one or more physical processors, the method comprising:
transmitting, by the remote system, at least a portion of capture information characterizing video content to a computing device prior to transmitting the video content to the computing device, the transmitted capture information enabling the computing device to positively identify one or more undesirable portions of the video content without the video content while not enabling the computing device to positively identify one or more desirable portions of the video content, wherein the transmitted capture information that enables positive identification of the one or more undesirable portions of the video content while not enabling positive identification of the one or more desirable portions of the video content includes average color information defining average colors of visuals captured within the video content, wherein the computing device identifies the one or more undesirable portions of the video content based on the transmitted capture information and identifies one or more potentially desirable portions of the video content to include an inverse of the one or more undesirable portions of the video content;
receiving, by the remote system, the identification of the one or more potentially desirable portions of the video content from the computing device; and
responsive to the reception of the identification, streaming, by the remote system, one or more portions of video information defining at least some of the one or more potentially desirable portions of the video content to the computing device.

12. The method of claim 11, further comprising:
generating, by the remote system, derivative visual information defining one or more derivative visual content based on the one or more potentially desirable portions of the video content, individual derivative visual content corresponding to and generated from the individual potentially desirable portions of the video content, the individual derivative visual content characterized by lower fidelity than the corresponding individual potentially desirable portions of the video content; and
streaming, by the remote system, the derivative visual information defining the one or more derivative visual content to the computing device.

13. The method of claim 12, wherein streaming the one or more portions of the video information defining at least some of the one or more potentially desirable portions of the video content to the computing device includes:
receiving one or more selections of the derivative visual content from the computing device, wherein the at least some of the one or more potentially desirable portions of the video content correspond to the one or more selected derivative visual content.

14. The method of claim 11, wherein the capture information further includes one or more capture motion information defining capture motion of the video content, or histogram information defining one or more histograms of the visuals captured within the video content.

15. The method of claim 11, wherein the at least some of the transmitted capture information includes average RGB values calculated by one or more image signal processors of an image capture device that captured the video content.

16. The method of claim 15, wherein the computing device stores the transmitted capture information to perform different analysis of the transmitted capture information at different times to identify different portions of the video content without requesting retransmission of the capture information.

17. A method for receiving streams of video edits, the method performed by a computing device include one or more physical processors, the method comprising:

receiving, by the computing device, at least a portion of capture information characterizing video content from a remote device prior to reception of the video content from the remote device, the received capture information enabling the computing device to positively identify one or more undesirable portions of the video content without the video content while not enabling the computing device to positively identify one or more desirable portions of the video content, wherein the received capture information that enables positive identification of the one or more undesirable portions of the video content while not enabling positive identification of the one or more desirable portions of the video content includes average color information defining average colors of visuals captured within the video content;

identifying, by the computing device, the one or more undesirable portions of the video content based on the received capture information and without the video content;

identifying, by the computing device, one or more potentially desirable portions of the video content to include an inverse of the one or more undesirable portions of the video content;

transmitting, by the computing device, the identification of the one or more potentially desirable portions of the video content to the remote device; and receiving, by the computing device, a stream of one or more portions of video information defining at least some of the one or more potentially desirable portions of the video content from the remote device.

18. The method of claim 17, further comprising:
receiving, by the computing device, a stream of derivative visual information defining one or more derivative visual content from the remote device, the derivative visual information generated based on the one or more potentially desirable portions of the video content by the remote device, individual derivative visual content corresponding to and generated from the individual potentially desirable portions of the video content, the individual derivative visual content characterized by lower fidelity than the corresponding individual potentially desirable portions of the video content;

selecting, by the computing device, one or more of the derivative visual content; and transmitting, by the computing device, the one or more selections of the derivative visual content to the remote device, wherein the at least some of the one or more potentially desirable portions of the video content correspond to the one or more selected derivative visual content.

19. The method of claim 17, wherein the capture information further includes one or more of capture motion information defining capture motion of the video content, or histogram information defining one or more histograms of the visuals captured within the video content.

20. The method of claim 17, wherein the at least some of the received capture information includes average RGB values calculated by one or more image signal processors of an image capture device that captured the video content.

* * * * *